(12) United States Patent
Reimann

(10) Patent No.: US 11,899,092 B2
(45) Date of Patent: Feb. 13, 2024

(54) TRAVEL TIME MEASUREMENT BASED ON FREQUENCY SWITCHING

(71) Applicant: LAMBDA:4 ENTWICKLUNGEN GMBH, Hamburg (DE)

(72) Inventor: Rönne Reimann, Hamburg (DE)

(73) Assignee: LAMBDA:4 ENTWICKLUNGEN GMBH, Hamburg (DE)

(*) Notice: Subject to any disclaimer, the term of this patent is extended or adjusted under 35 U.S.C. 154(b) by 302 days.

(21) Appl. No.: 17/430,376

(22) PCT Filed: Feb. 11, 2020

(86) PCT No.: PCT/EP2020/053410
§ 371 (c)(1),
(2) Date: Dec. 14, 2021

(87) PCT Pub. No.: WO2020/165134
PCT Pub. Date: Aug. 20, 2020

(65) Prior Publication Data
US 2022/0128676 A1    Apr. 28, 2022

(30) Foreign Application Priority Data

Feb. 13, 2019  (DE) .......................... 202019100829.6
Apr. 1, 2019   (WO) ................. PCT/EP2019/058153

(51) Int. Cl.
*G01S 11/08*        (2006.01)
(52) U.S. Cl.
CPC .................................... *G01S 11/08* (2013.01)

(58) Field of Classification Search
CPC ............. G01S 11/08; G01S 3/46; G01S 11/02
See application file for complete search history.

(56) References Cited

U.S. PATENT DOCUMENTS

| 4,087,816 A | 5/1978 | Barszczewski et al. |
| 4,283,726 A | 8/1981 | Spence |
| 6,240,152 B1 | 5/2001 | Ho |

(Continued)

FOREIGN PATENT DOCUMENTS

| EP | 2204669 | 7/2010 |
| WO | 2018059782 | 4/2018 |

OTHER PUBLICATIONS

ADF4196 Fractional-N PLLs Frequency Synthesizers; www.mouser.in/new/Analog-Devices/ad-ad4196-synthesizers/; Feb. 5, 2019.

(Continued)

*Primary Examiner* — Dac V Ha
(74) *Attorney, Agent, or Firm* — Sand, Sebolt & Wernow Co., LPA

(57) ABSTRACT

Method for determining a first virtual frequency switching time between a first frequency of a first signal emitted by a first object having a first phase progression and a first further frequency of a first further signal emitted from the first object. First virtual frequency switching time is determined as a time at which, at a second object, the phase relationship between an interpolated or received phase position of the first signal and an interpolated or received phase position of the first further signal corresponds to a first phase relationship between the first further phase progression and first phase progression.

25 Claims, 5 Drawing Sheets

(56) References Cited

U.S. PATENT DOCUMENTS

Figure 1:
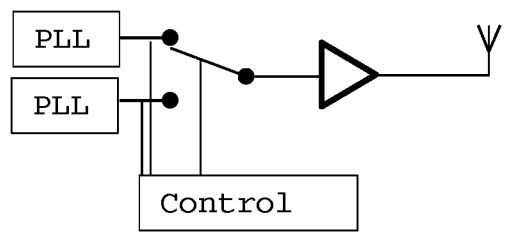

| | | | |
|---|---|---|---|
| 6,868,073 | B1 | 3/2005 | Carrender |
| 9,014,239 | B2 | 4/2015 | Bonin et al. |
| 11,290,844 | B2 * | 3/2022 | Nonin ................ G07C 9/00309 |
| 2010/0207820 | A1 | 8/2010 | Kawano et al. |
| 2022/0095262 | A1 * | 3/2022 | Kazaz .................. H04L 5/0048 |
| 2023/0030936 | A1 * | 2/2023 | Behera ................. H04J 3/0667 |

OTHER PUBLICATIONS

A 10μs Fast Switching PLL Synthesizer for a GSM/EDGE Base-Station; ISSCC 2001/Session 10/Cellular Systems and Building Blocks/10.6; 2004 IEEE International Solid-State Circuits Conference; 0-7803-8267-6/04; 2004.

* cited by examiner

TRAVEL TIME MEASUREMENT BASED ON FREQUENCY SWITCHING

The invention relates to synchronization, range finding and radio-system metrics. Numerous methods for synchronization and range finding are known from the prior art. The use of PLLs in radio systems for frequency-variable generation of signals is also known. Likewise, it is known that PLLs may be retuned from a first frequency to a second frequency.

Furthermore, phase synchronous switching between two PLLs is known from U.S. Pat. No. 6,240,152. It is also known how to determine the phase difference between two signals. Also known from U.S. Pat. No. 4,087,816 is the creation of a ground-based global positioning system consisting of several emitting stations, which are time-synchronized by means of high-precision clocks, each of which emits permanently a first fundamental frequency with high frequency stability in the kHz range and intermittently and repeatedly switches to the transmission of a slightly changed second frequency in a phase-coherent manner. In such a system, a corresponding receiver may determine its position with an accuracy of up to 500 m, which is more accurate than would be the case without switching to a slightly changed frequency.

The object of the invention is to simplify known methods, uses and devices, and enable simpler and faster and/or more accurate measurements. Faster measurements can contribute to increasing accuracy, e.g., by repeating measurements several times. However, faster measurements also contribute to accuracy in non-static arrangements by allowing changes in the arrangements to have an impact on measurements only within a shorter time window. This is in particular important for smaller wavelengths, especially if the movement reaches a non-negligible proportion of the wavelengths during measurements.

The invention draws on the information that by switching between a first frequency (f1) and at least a first further frequency (f1w.n, n is always a natural integer greater than 0), a time in the signal progression may be determined more precisely than is possible with previous means and methods. By using several more frequencies, several such points in time may be determined and the wavelength-dependent ambiguity of the measurements may be reduced or avoided and, furthermore, greater accuracy may be achieved. This is extremely useful and resource-saving, especially at high frequencies in the MHz range and/or at distances between objects of less than 100 km, especially less than 10 km, and moreover, in order to limit the effort involved with signal generation and measurements. What's more, it enables distance determination between a first and second object, in particular, exclusively by means of signals from the first and second object. In particular, a distance of the objects is determined with an accuracy of better than 50 cm, usually even better than 10 cm, especially for distances up to 100 km, in particular up to 10 km. For greater distances, the applicable emission limits in the MHz and GHz ranges, in practice, pose regulatory obstacles. Known transmission systems may be used, provided they are capable of performing a frequency switch, while at the same time knowing or determining the phase position. In particular, the signals used are those which are also used, in particular simultaneously, for digital transmission of data, in particular user data, in particular in the form of chips and/or symbols. In particular, signals of such transmission systems are used in the invention, especially the signals of a Bluetooth system. In particular, the objects are transceivers of a digital-data transmission system, in particular, operating with QAM.

The object is achieved, e.g., by a synchronization method by determining and/or for determining at least a first and a second virtual frequency switching time.

The first first virtual frequency switching time is here one between a first frequency (f1) of a first signal (S1) emitted from a first object (emitter, it should be noted here that the first object acts additionally as a receiver, and the second object acts additionally as an emitter) having a first-phase progression and a first first further frequency (f1w.1) of a first first further signal (S1w.1) emitted from the first object (emitter) and having a first first further phase progression, wherein the first phase progression of the first signal (S1) has a first first phase relationship (phi1.1) relative to the first first further phase progression of the first first further signal (S1w.1), wherein the first first phase relationship (phi1.1) is predetermined and/or known and/or determined, wherein the at least one first virtual frequency switching time (t1.1) is determined from a phase progression received at the second object (receiver) of the first signal received at the second object (receiver) and the phase progression of the first first further signal (S1w.1) received at the second object (receiver) as a time, at which the phase relationship between an interpolated and/or received phase position of the first signal (S1) and an interpolated and/or received phase position of the first first further signal (S1w.1) corresponds to the first phase relationship (phi1.1).

As for the second virtual frequency switching time, the method preferably proceeds in an analogous but reverse manner.

There may be several first further signals (Sw1.n) and several first further frequencies (f1w.n). The first signal or frequency thereof may be designated as the first first further signal (Sw1.1) and first first further frequency (f1w.1).

In particular, the first phase relationships between successive first further signals S1w.m-1 and S1w.m with m out of n are denoted by phi1.m. The second phase relationships between successive second further signals S2w.m-1 and S2w.m with m out of n are denoted, in particular, by phi2.m The phase progression of the first signal (S1) has the first first phase relationship (phi1.1) for the first further phase progression of the first further signal (S1w.1) at the first object, in particular, at a first switching time (toggling time). The possibly several first further signals (S1w.n, n being an integer greater than or equal to 1) have a first phase relationship (phi1.n) among one another and/or to the first signal (S1) at the first object. Neither the first, nor a first further signal needs to be emitted at the switching time (toggling time). There may also be an interruption of the emission at the switching time (toggling time). First signals, first further signals, second signals and/or second further signals each have, in particular, a constant frequency. Thus, the first signal at the first object extrapolated into the future, and the first further signal at the first object extrapolated into the past may have the first phase relationship at the switching time (toggling time). This may be necessary, for example, if only one PLL is used to generate the signals, and this PLL has to be retuned within a certain time window from the first frequency via intermediate frequencies to the first further frequency. In particular, the intermediate frequencies are then not considered to be part of the first signal, nor part of the first further signal. At the switching time (toggling time), neither the first, nor the first further signal is then emitted. An intermediate signal may or may not be emitted. For example, the first phase relationship between the first signal at the first object and the first first further signal at the first object may be determined and/or measured by extrapolating the first signal at the first object and the first first further signal at the first object, respectively, up until the switching time (toggling time). If the behavior of the applied hardware is known, it is usually not necessary to measure the first phase relationships at the first object and the second phase relationships at the second object. This is the case, in particular if, e.g., a first and a first further signal with a predetermined phase relationship can be created at the first object at a switching time (toggling time) by controlling the applied hardware.

The same applies accordingly to the second and the at least one second further signal.

In particular, by extrapolating the phase progression of the received first signal at the second object into the future, and extrapolating the phase progression of the received first further signal at the second object into the past, it also becomes possible to determine a first virtual frequency switching time, at which the extrapolated phase progressions at the second object have the first first phase relationship (phi1.1), in particular if a time interval exists between the first signal and the first further signal. The/a time, for which this would apply, may be used as a virtual frequency switching time for synchronization. It can be determined with a very high degree of accuracy and thus allows for a synchronization accuracy that cannot be achieved with previous methods, especially when using simple and/or inexpensive hardware. Hence, a distinction can be made with [sic] the second signal and the first second further signal, as well as between successive first further signals, as well as between second further signals. A synchronization accuracy of only a few nanoseconds is thus achievable.

In particular, the first signal (S1) and the at least one first further signal (S1w.n) are generated by means of a single PLL, or are generated by means of two PLLs, between which switching is done in order to change the frequency. The signals may be generated and/or emitted with no pause in between or with a pause in between. Also, preferably, an abrupt change and/or a change without the use of intermediate frequencies may be performed between the frequencies, or the frequency may be changed from the first to the second frequency more or less continuously and/or by using intermediate frequencies. In the case of a switch with the generation of intermediate frequencies, intermediate frequencies may also be emitted, or their emission may be partially or completely suppressed. The same applies accordingly to the second and the at least one second further signal.

Preferably, between the end of the first signal (S1) with the first frequency and the beginning of the first further signal (S1w) with the first further frequency, there is a time interval of a at most 500 µs, in particular at most 300 µs, in particular at most 30 µs, in particular at most 1 µs, and/or particularly preferably at most five, in particular at most two, periods of the first or the first further signal. The same applies accordingly to the second and the at least one second further signal.

When using intermediate frequencies, the beginning of the first further signal is characterized in particular by the frequency of the second further signal being constant and/or stable, in particular for at least 1 ms, in particular at least 5 ms, and/or at least one, in particular at least two periods of the first further signal. The same applies accordingly to the second and the at least one second further signal.

It is preferred that the first frequency differs from the one further frequency by a first difference (df1), wherein in particular the first difference (df1) has a value of at least 0.02‰, in particular at least 0.04‰ of the frequency of the first or first further signal, and/or of at least 50 kHz, in particular at least 100 kHz, and/or of at most 5%, in particular at most 4.2%, of the frequency of the first or first further signal and/or of at most 120 MHz, in particular at most 100 MHz, and/or wherein the first difference (df1) has a value in the range of 100 kHz multiplied by the unitless number of the phase resolution in degrees achieved by the number of samplings of the first signal (S1) or the first further signal (S1w) performed to 80 MHz multiplied by the unitless number of the phase resolution achieved by the number of samplings of the first signal (S1) or first further signal (S2) performed.

The same applies accordingly to the second and the at least one second further signal.

Phase resolution, in particular, refers to the accuracy measured in degrees, however, without the unit degree of the measurement of the phase position based on the usually performed several measurements. In this case, the phase resolution improves with an increase in the number of measurements and assumes a lower value. In practice, phase resolutions of 0.1° to 10°, in particular 0.5° to 3°, are generally to be anticipated. To calculate said frequency difference range, the ° unit should be removed.

Preferably, a first virtual frequency switching time between the first frequency (f1) and a first first further frequency and at least one further first virtual frequency switching time between at least two first further frequencies (F1w.n) are determined, or are at least two virtual frequency switching times between the first frequency (f1) and at least two first further frequencies (F1w.n), wherein first phase relationships (phi1.n) exist between the successive first and/or first further signals at the first object, wherein the first phase relationships (phi1.n) at the first object are predetermined and/or known and/or determined, wherein the at least two first virtual frequency switching times (t1.n) are determined, as a time when the phase relationship between the interpolated and/or received phase positions of two, in particular successive signals from the first and the at least two first further signals (S1, S1w.n) at the second object corresponds to the respective first phase relationship (phi1.n) between these signals at the first object.

Preferably, a second virtual frequency switching time between the second frequency (f2) and a first second further frequency and at least one further second virtual frequency switching time between at least two second further frequencies (f21w.n) are determined, or are determined at least two virtual frequency switching times between the second frequency (f2) and at least two second further frequencies (f2w.n), wherein second phase relationships (phi2.n) exist between successive second and/or second further signals, wherein the second phase relationships (phi2.n) at the second object are predetermined and/or known and/or determined, wherein the at least two second virtual frequency switching times (t2.n) are determined from a phase progression of the second signal (S2) received at the first object and the phase progressions of the at least two second further signals (S2w.n) received at the first object, in each case as a time, at which the phase relationship between the interpolated and/or received phase positions of two signals from the second and the at least two second further signals (S2, S2w.n) at the first object corresponds to the respective second phase relationship (phi2.n) between these signals.

Preferably, the first object and the second object have a distance of 100 km and less, in particular 10 km and less, in particular 1 km and less.

Preferably, the first and/or second frequency and/or the further frequencies, e.g., the first further frequency(ies) and/or the second further frequency(ies) are above 1 MHz, in particular above 50 MHz, more preferably above 250 MHz, in particular in the range up to 50 GHz.

In particular, the first, second, first further and/or second further signals are signals, which are used, in particular simultaneously, for digital data transmission, in particular by means of the transmission of chips and/or symbols, in particular signals of a digital, in particular QAM-based data transmission system, in particular a chip-synchronized and/or symbol-synchronized digital data transmission system.

Preferably, at least one, in particular at least two, of the virtual frequency switching times is used for synchronization of the second object (receiver) and/or of the first and/or first further signal received at the second object (receiver), in particular for synchronization with respect to a signal emitted from the first object (emitter), in particular the first signal (S1) and/or a first further signal (S1w.n) and/or with respect to a first alternating time and/or a timer of the first object and/or a timer synchronized with the first object and/or for synchronization with respect to a signal emitted from the second object, in particular the second signal (S1) and/or a second further signal (S2w.n) and/or a second alternating time and/or a timer of the second object and/or a timer synchronized with the second object. The synchronization, for example, to a first or first further signal of the first object may be performed, in particular, such that the second object determines the time, relative to a timer of the second object or a timer synchronized with the second object, at which the first or first further signal was emitted at the first object.

Synchronization, e.g., to a first switching time at the first object may in particular be performed, such that the second object determines the time relative to a timer of the second object or a timer synchronized with the second object, at which the switching time at the first object occurred and/or was situated.

The same applies similarly to the second, the second further signals and second switching times.

Advantageously, a first switching time (toggling time) at which the phase relationship between the phase position of the first signal (S1), possibly extrapolated into the future, and the phase position of the first first further signal (S1w.1), possibly extrapolated into the past, at the first object (emitter) corresponds to the first first phase relationship (phi1.1) has a predetermined and/or determinable time relationship relative to a signal emitted and/or received by the first object (emitter). This makes it possible, for example, to determine a round-trip time of a signal and/or implement synchronization in a particularly simple and reliable fashion.

In particular, in a method for range finding or for measuring a change in distance, the phase position of the first signal (S1) and/or of the at least one first further signal (S1w.n) at the second object (receiver) is determined at a first virtual frequency switching time (t1.n) and the phase position of the second signal (S2) and/or of the at least one second further signal (S2w.n) at the first object is determined at a second virtual frequency switching time (t2.n), and these are then used for range finding and/or for measuring the change in distance between the first and second object.

Preferably, a first time difference (dt1) between a first virtual frequency switching time (t1.n) determined according to any of the preceding claims and the reference time (t1') and/or second switching time is predetermined and/or known and/or measured and/or determined at the second object. Preferably, a second time difference (dt2) between a first switching time (toggling time), at which the phase relationship between the phase position of the first signal (S1) and the phase position of the first first further signal (S1w.n) at the first object corresponds to the first phase relationship (phi1.1), and reception of the reference signal (RS) and/or a virtual second frequency switching time (t2.n) at the first object is predetermined and/or known and/or is measured and/or determined. Preferably, a signal round-trip time and/or signal runtime and/or phase round-trip shift between the first object and the second object is determined by means of and/or from the first time difference (dt1) and second time difference (dt2), in particular calculated, in particular the signal round-trip time is calculated by the time lag between the first switching time at the first object and the determined second virtual frequency switching time less the first time difference (dt1), and less the second time difference (dt2). Particularly advantageous, one, in particular several measured first and second time differences are provided at a shared location for evaluation and are used, in particular, for signal round-trip time, signal runtime, time synchronization and/or time determination, and/or correction.

Due to the round-trip time known here, and thus the double runtime between the first and second object, an even more accurate time synchronization—because corrected by the runtime factor—may be performed. Such time synchronization eliminates the need for high-precision clocks, as are still required in U.S. Pat. No. 4,087,816.

The object is also achieved by a method for signal round-trip time measurement and/or signal runtime measurement and/or phase round-trip shift measurement, in particular for distance determination and/or for determining the change in distance between a first and second object, at least between a first object and a second object, comprising the steps of:

Performing a reference sequence including, at least once, the following steps of:
Emitting a reference signal (RS) from the second object to the first object before, at, and/or after a first reference time (t1'), in particular with at least a first reference frequency;
Receiving the reference signal (RS) at the first object, wherein at the second object, a first time difference (dt1) between a first virtual frequency switching time (t1) determined according to any of the preceding claims and the reference time (t1') is predetermined and/or known and/or determined, and
wherein at the first object, a second time difference (dt2) between a first switching time (toggling time), at which the phase relationship between the phase position of the first signal (S1) and the phase position of the first first further signal (S1w.1) at the first object corresponds to the first first phase relationship (phi1.1), and reception of the reference signal (RS) at the first object is predetermined and/or known and/or determined, and
calculating a signal round-trip time and/or signal runtime and/or phase round-trip shift between the first and second object by means of and/or from the first time difference (dt1) and second time difference (dt2).

In particular, the signal round-trip time is calculated by means of the time lag between the first switching time at the first object and the reception of the reference time of the reference signal at the first object less the first time difference (dt1) and less the second time difference (dt2).

In particular, the first time difference is determined, in particular measured, at the second object, or the second time difference is determined, in particular measured, at the first object.

The reference signal may be sent, such that it starts at the reference time. It may also start before the reference time and end at it or be emitted beyond it. In particular, it involves a change, such as an edge or a frequency change, at the reference time. It may also be emitted before and after the reference time and may be interrupted at the reference time, in particular for a maximum period of 5 ms. For example, a part of the reference signal, in particular a second signal (S2), may be emitted before the reference time and a second part of the reference signal, in particular a second further signal (S2w), may be emitted after the reference time, in particular, the second switching time, as the time at which the second signal with a second frequency has a second phase relationship (phi2) to the second further signal, coincides with the reference time. At the reference time, the reference signal may be interrupted, in particular for a maximum period of five, in particular a maximum of two periods of the reference signal, of the second signal or of the second further signal, and/or of a maximum of 500 ms, in particular a maximum of 300 ms, in particular a maximum of 30 ms, in particular a maximum of 1 ms.

Preferably, the method is conducted, such that the reference signal (RS) has a second signal (S2), in particular before the first reference time (t1'), and at least one second further signal (S2w.1), in particular after the first reference time (t1'), wherein the second signal (S2) has a second frequency and a second phase progression, and the at least one second further signal (S2w.1) having a second further frequency and a second further phase progression, wherein the second phase progression of the second signal (S2) relative to the second further phase progression of the second further signal (S2w.1) has a second phase relationship (phi2.1), wherein the second phase relationship (phi2.1) is predetermined and/or known and/or determined, wherein a second virtual frequency switching time (t2.1) is determined from a temporal phase progression of the second signal (S2) received at the first object and the temporal phase progression of the second further signal (S2w.1) received at the first object as a time, at which the phase relationship between an interpolated and/or received phase position of the second signal (S2) and an interpolated and/or received phase position of the second further signal (S2w.1) corresponds to the second phase relationship (phi2.1), wherein at the first reference time (also second switching time) (t1') the phase relationship between the phase position of the second signal (S2) and the phase position of the second further signal (S2w.1) at the second object corresponds to the second phase relationship (phi2.1).

Advantageously, the phase relationship at the second object between the reference signal (RS), the second signal (S2) and/or second further signal (S2w.n), and the first signal (S1) and/or the phase relationship between reference signal (RS), in particular the second signal (S2) and/or the second further signal (S2w), and the first further signal (S1w.n) is determined and/or predetermined.

Advantageously, the phase relationship at the first object between reference signal (RS), in particular the second signal (S2) and/or the second further signal (S2w), and the first signal (S1) and/or the phase relationship between reference signal (RS), in particular the second signal (S2) and/or the second further signal (S2w.n), and the first further signal (S1w.n) is determined and/or predetermined.

Preferably, at least one, in particular both of these phase relationships are used to measure the distance between the first and second objects and/or the change in distance between the first and second objects.

For example, by means of the phase relationship(s), a phase shift in the signal round trip from the first to the second to the first object, or from the second to the first to the second object or the phase shift for the path from the first to the second, or from the second to the first object may be determined, and a distance or a change in distance between the first and second object may be determined therefrom.

Preferably, among several possible first virtual frequency switching times between a first and a first further signal or between two first further signals (Sw1.n), the first virtual frequency switching time (t1.n) is determined according to the same rule as applies to the first switching time (t1') among several possible switching times between the first and the first further signal. Preferably, for second and second further signals the above applies accordingly.

Alternatively or additionally, among several possible first virtual frequency switching times between a first and a first further signal or between two first further signals, the or a middle one is preferably determined as the first virtual frequency switching time (t1), and among several possible first switching times between a first and a first further signal or between two further signals, the first or a middle one is determined as the switching time (t1'). Preferably, for second and second further signals the above applies accordingly.

Preferably, among several possible first virtual frequency switching times between a first and a first further signal or two first further signals, the first virtual frequency switching time (t1) is determined as the one situated at the same position in the signal progression of the first signal (S1) and first further signal (S1w) or of the two first further signals as the first switching time (t1'). Preferably, for second and second further signals the above applies accordingly.

Analogously, this advantageously applies to the second virtual frequency switching time and/or second switching time.

Advantageously, after a first signal (S1), several first further signals (S1w.n) are emitted in succession and/or a first signal (S1) and a first further signal (S1w.n), in particular a different signal are emitted several times in succession, in particular without intermittently emitting a second or second further signal and/or without intermittently switching between sending and receiving at the first and/or second object, in particular without switching over and/or switching off an amplifier at the first and/or second object. This allows the accuracy to be increased and/or several measurements to be made in quick succession.

Advantageously, in addition or alternatively, after a second signal (S2), several second further signals (S2w) may be emitted in succession, and/or several second signals (S2) and a second, in particular, different further signal (S2w.n) may be emitted in succession, in particular without emitting intermittently a first or first further signal and/or without switching intermittently between sending and receiving at the first and/or second object, in particular without switching over and/or switching off an amplifier at the first and/or second object. This allows the accuracy to be increased and/or several measurements to be made in quick succession.

In particular, several refers to at least three times, especially at least five times.

In particular, a first virtual frequency switching time is determined between each first further signal and the subsequent first or first further signal. In particular, the preceding first further signal is understood to be the first signal and the subsequent first further signal is understood to be the first further signal, and the method according to the invention, with or without advantageous embodiments, is additionally performed using this conceptual renaming.

In particular, a second virtual frequency switching time is determined between each second further signal and the subsequent second or second further signal. In particular, the preceding second further signal is understood to be a second signal, and the subsequent second further signal is understood to be a second further signal, and the method according to the invention, with or without advantageous embodiments, is additionally performed with this conceptual renaming.

The object is also achieved by using at least one first virtual frequency switching time ($t1.n$) between a first frequency ($f1$) of a first signal ($S1$) emitted from a first object (emitter) and having a first phase progression and a first further frequency ($f2$) of a first further signal ($S1w.n$) emitted from a first object (emitter) and having a first further phase progression, and in particular at least one second virtual frequency switching time ($t2.n$) between a first frequency ($f1$) of a first signal ($S2$) emitted from a second object, and having a second phase progression and a second further frequency ($f2$) of a second further signal ($S2w.n$) emitted from the second object, and having a second further phase progression for determining a time, a distance, a runtime and/or for synchronizing two time measurements, wherein the first phase progression of the first signal ($S1$) has a first phase relationship (phi1.1) relative to the first further phase progression of the first further signal ($S1w.n$) at the first object (emitter), wherein the first phase relationship (phi1.1) is predetermined and/or known and/or determined, wherein in particular the second phase progression of the second signal ($S2$) has a second phase relationship (phi2.2) to the second further phase progression of the second further signal ($S1w.n$) at the second object, wherein the second phase relationship (phi2.2) is predetermined and/or known and/or determined, wherein from a phase progression received at the second object) of the first signal ($S1$) received at the second object) and the phase progression of the first further signal ($S1w.n$) received at the second object (receiver), the at least one first virtual frequency switching time ($t1.1$) is determined as a time, at which the phase relationship between an interpolated and/or received phase position of the first signal ($S1$) and an interpolated and/or received phase position of the first further signal ($S1w.n$) corresponds to the first phase relationship (phi1.1), wherein, in particular, from a phase progression received at a first object of the second signal ($S1$) received at the first object and of the phase progression of the second further signal ($S2w.n$) received at the first object, the at least one second virtual frequency switching time ($t2.1$) is determined as a time, at which the phase relationship between an interpolated and/or received phase position of the second signal ($S2$) and an interpolated and/or received phase position of the second further signal ($S2w.n$) corresponds to the second phase relationship (phi2.1).

As for the use and the individual aspects, in particular frequencies, signals, time lags, points in time and/or phase relationships, the above explanation applies advantageously to the methods. Further advantageous embodiments of the methods and their use will be described below.

In particular, a method according to the invention is repeated several times, in particular in immediate succession, and/or wherein several frequency changes are performed at the first object (emitter), and/or several first further signals are emitted in succession, in particular consecutively. In particular, at least two, in particular at least four different frequencies ($f1w.n$, e.g., $f1w.1$, $f1w.2$, $f1w.3$, $f1w.4$) are used for the first further signals, which in particular also all differ from the first frequency. The first signal may also be emitted once or several times between the first further signals. Thus, possible sequences are, e.g., $f1$, $f1w.1$, $f1w.2$, $f1w.3$, $f1w.4$ or $f1$, $f1w1$, $f1$, $f1w.2$, $fiw.3$, $f1w.4$, and $f1$.

In particular, in a series of emitting different frequencies, the first or second frequency is emitted at least twice, with a further frequency emitted in between.

Switching between the frequencies takes place in particular as described between the first and first further frequency, e.g., between $f1w.1$ and $f1w.2$.

In particular, the first and the first further frequencies are selected, such that a maximum number of different difference frequencies may be created from the first and the first further frequencies.

The same applies to the second further signals. In particular, several frequency changes are performed, in particular in immediate succession at the second object (emitter), and/or several first second signals are emitted in succession, in particular consecutively. In particular, at least two, in particular at least four different frequencies are used for the second further signals, which in particular also all differ from the second frequency.

In particular, the second and second further frequencies are selected, such that a maximum of many different difference frequencies may be created from the second and second further frequencies.

In particular, the first and the second and the at least one first further and the at least one second further frequencies are selected, such that a maximum number of different difference frequencies may be created from the first, the second and the at least one first further and the at least one second further frequencies.

In particular, the first and the first further frequencies do not have equal distances. In particular, the second and second further frequencies do not have equal distances.

In particular, the first and the at least one first further frequency and the second and the at least one second further frequency do not have equal distances.

Advantageously, the distances between the switches of the first further frequency are constant, predetermined and/or determinable, in particular from preceding signals, and in particular they have a time gap in the 1-200 μs range.

In particular, when the second object emits second and/or second further signals, several frequency changes are performed at the second object and/or several second further signals are emitted successively, in particular consecutively, and/or the intervals between the changes of the second further frequencies are designed to be constant, predetermined and/or determinable, in particular from preceding signals, and in particular they have a time gap in the 1-200 μs range.

In particular, a first signal ($S1$) and at least one first further signal ($S1w.n$) are first emitted from the first object followed by emission from the second object of a second (S2) and at least three, in particular at least five, second further signals (S2w.n). In particular, emission from the second object takes place after receiving the first signal and/or a first further signal.

In particular, the reference signal (RS) includes a second and at least three, in particular at least five, second further signals (S2w.n).

In particular, a second signal and at least one second further signal are emitted from the second object, followed by emission from the first object of a first and at least three, in particular, at least five first further signals.

Particular advantageously, at least one first virtual frequency switching time is determined on the basis of at least two, in particular at least ten samplings of the first and of the first first further signal, or at least of two first further signals and/or at least of one second virtual frequency switching time is determined on the basis of at least two, in particular at least ten samplings of the second and of the first second further signal or of at least two second further signals.

Advantageously, information is contained, in particular modulated, in the first, second, first following and/or second further signal, and/or in the reference signal, in particular information which is used for implementing the method according to the invention and/or information, which represents the user data of a transmission system.

In particular, the phase of the first signal is coherent with the phase of the first further signal at the switching time, the first phase relationship is equality, and/or the phase of the second signal is coherent with the phase of the second further signal at the switching time and/or the second phase relationship is equality, and/or the first and/or the second phase difference is at least 5°.

In particular, the first and first further frequencies differ. In particular, the second and second further frequencies differ. In particular, several first further signals differ in terms of their frequencies and/or several second further signals differ in terms of their frequencies. Not all of these have to be different, preferably at least five, in particular at least ten different frequencies are used in the first and first further, in particular, consecutive signals. Preferably, at least five, in particular at least ten different frequencies are used in second and second further, in particular, consecutive signals.

It should be noted that the emitted phase progression does not necessarily correspond to the received phase progression, in that environmental influences may change the signal. Multipathing effects may cause, e.g., signal components of the emitted signal to overlap at the receiver with a time delay and hence distort the signal. The method, as well as the devices according to the invention are in particular designed, such that the virtual frequency switching times are determined at a signal component, in particular the signal component with the greatest power at the receiver and/or the earliest signal component at the receiver.

In an advantageous embodiment, the determination of the first first virtual frequency switching time is performed by extrapolation of samplings of the first signal at the second object, in particular by interpolation and/or equalization calculation of the samplings of the first signal at the second object, in particular on a predetermined and/or anticipated signal progression and extrapolation of the samplings of the first further signal at the second object, in particular by interpolation and/or equalization calculation of the samplings of the first signal at the second object, in particular on a predetermined and/or anticipated signal progression, and determination of a time as a first virtual frequency switching time, at which the extrapolated phases have the first phase relationship (phi1.1), in particular considered as modulo 2 Pi. It is only important that the samplings be performed at the second object, the other steps may be performed at the second object. However, the results of the samplings may also be emitted to an evaluation unit, e.g., set up separately or set up in the first and/or second object, and the further steps may be performed by the evaluation unit. The same preferably applies accordingly to the other virtual frequency switching times.

In an advantageous embodiment, the determination of the first second virtual frequency switching time is performed accordingly by extrapolation of samplings of the second signal at the first object, in particular by means of interpolation and/or equalization calculation of the samplings of the second signal at the first object, in particular on a predetermined and/or anticipated signal progression, and extrapolation of the samplings of the first second further signal at the first object, in particular by means of interpolation and/or equalization calculation of the samplings of the first second signal at the first object, in particular on a predetermined and/or anticipated signal progression, and determination of a time as the first second virtual frequency switching time at which the extrapolated phases have the second phase relationship (phi2.1), in particular considered as modulo 2 Pi. It is only important that the samplings be performed at the first object, the further steps may or may not be performed at the first object. However, the results of the samplings may also be emitted to an evaluation unit, e.g., set up separately, or in the first and/or second object, and the further steps may be performed by the evaluation unit.

In another advantageous embodiment, the first virtual frequency switching time is determined by extrapolation of the summed phase change of the first signal, in particular interpolated and/or approximated by an equalization calculation, in particular into the future, and by extrapolation of the summed phase change of the first further signal, in particular interpolated and/or approximated by an equalization calculation, in particular into the past, and a time is determined, at which the extrapolated summed phases have the first phase relationship, in particular considered as modulo 2 Pi.

In another advantageous embodiment, the second virtual frequency switching time is determined by extrapolation of the summed phase change of the second signal, in particular interpolated and/or approximated by equalization calculation, in particular into the future, and by extrapolation of the summed phase change of the second further signal, in particular interpolated and/or approximated by equalization calculation, in particular into the past, and a time is determined, at which the extrapolated summed phases have the second phase relationship, in particular considered as modulo 2 Pi. The same preferably applies accordingly to the other virtual frequency switching times.

In particular, phase changes due to modulation and/or signal distortion are excluded prior to interpolation, equalization calculation and/or extrapolation.

In particular, the assignment of the samplings of the first and/or the first further signals to the first and/or the first further signal is done based on several equalization calculations and/or interpolations, expectations and/or assumptions regarding the position of the virtual frequency switching time and/or the first switching time in the progression of the first and first further signal and/or based on the detection of an interruption and/or change of the signal progression. The same applies to the second and second further signals.

The above explanations pertaining to the first virtual frequency switching time and/or for its determination advantageously apply in analogous fashion, alternatively or additionally, to the second virtual frequency switching time and/or its determination.

Advantageously, in particular at the second object, the phase progression of the first signal and/or of the first further signal, at least the phase progression during its emission, is known, predetermined or derivable, in particular from at least one first and/or first further signal.

Advantageously, in particular at the first object, the phase progression of the second signal and/or of the second further signal, at least the phase progression when emitted, is known, predetermined or derivable, in particular from at least one second and/or second further signal.

Advantageously, the first signal, the second signal, the first further signal and/or the second further signal is a periodic carrier and/or a periodic carrier with modulated information, e.g., by means of FSK, BPSK, QAM, n-QAM. In particular, the first signal, the second signal, the at least one first further signal and/or the at least one second further signal is a periodic signal. In particular, the first signal, the second signal, the at least one first further signal and/or the at least one second further signal is frequency-stable, such that phase jitter, in particular in the Fourier 100-300 kHz frequency range, is less than 15° and/or the frequency fluctuates with not more than +/−20 Hz within one second and/or the frequency distribution has a standard deviation of less than 20 Hz.

Especially advantageously, the first signal, the second signal, the at least one first further signal and/or the at least one second further signal is a radio signal of a known digital, in particular wireless transmission system and/or one of its components, e.g., a WLAN system, Bluetooth system, RFID system, LTE system, UMTS system, and a cellular-radio system. In particular, the method is implemented in such a system. In particular, the change between the first and first further frequency and/or the change between second and/or second further frequency is a frequency change provided in such a system, e.g., in the context of providing frequency-hopping.

The object is also achieved by a device set up for determining at least a first virtual frequency switching time (t1), synchronization, for signal round-trip time measurement and/or signal runtime measurement and/or for measuring the phase round-trip shift and/or for range finding and/or for measuring a change of distance, which has at least one receiving device for receiving a first signal (S1) and a first further signal and set up for determining a virtual frequency switching time between a first frequency (f1) of the first signal (S1) and a first further frequency (f1w.n) of the first further signal (S1w.n), in a manner described above with respect to a method.

In particular, the method and/or use comprises emitting the first signal and the first further signal from the first object.

The object is also achieved by a device set up to emit a first signal (S1) and at least one first further signal (S1w.n), in particular for synchronization, for measuring the signal round-trip time and/or for measuring the signal runtime and/or for measuring the phase round-trip shift and/or for range finding, involving at least one PLL for generating the first signal (S1) at a first frequency and the at least one first further signal (S1w.n) with a first further frequency, wherein the device is configured to perform the change between the generation of the first signal (S1) and the generation of the at least one first further signal (S1w.n) by using information about the phase difference (phi1.n) between the first signal (S1) and the at least one first further signal (S1w.n), in particular at a switching time (t1').

The object is also achieved by a system consisting of at least one device according to the two preceding paragraphs, in particular set up for shared implementation of a method described above.

In particular, a device according to the invention comprises at least one antenna, one memory and at least one processor for running a program stored in memory. In particular, the program is configured for performing a method according to the invention, in particular the steps performed according to the method at the first and/or second object.

In particular, the device represents a hardware and software device. In particular, each device is adapted to perform the method steps of the first object and/or the second object.

In particular, the device is configured to obtain information about the phase difference, in that it is configured to perform the switching coherently and/or with a predetermined phase difference and/or measure the phase difference. For the first, second signal and/or the at least one first further and/or second further signal, the device is in particular as described above for the method, in particular, such that it is configured for corresponding generation and/or switching.

For switching, the device may comprise, e.g., two PLLs between the outputs of which, it is configured for switching in order to use the signal of one PLL to emit the first and first further signals, respectively. However, it may also have, e.g., only a single PLL configured to switch between two frequencies, possibly outputting intermediate frequencies, e.g., a sweep from the first frequency to the first further frequency. In particular, one or both devices are also configured to emit a second signal and at least one second further signal. In particular, the above explanations pertaining to the first signal and the first further signal apply analogously.

In particular, the device is designed to realize the characteristics of the signals described for the method, in particular with respect to frequency stability and frequency differences, and/or to determine the phase position with the described accuracy.

It is particularly advantageous that several second receiving devices for receiving the first and at least one first further signal are/will be provided locally and fixedly attached to the second object, however, spaced apart therefrom, in particular spaced apart by at least 10 cm, and/or at least one virtual frequency switching time will be determined with respect to each of the several second receiving devices, in particular per frequency switching between the first and first further signals and/or between the first further signals. In particular, the second object and the several second receiving devices are included in a motor vehicle and/or the first object represents a means of access, in particular a wireless key. In particular, the second object and the multiple second receiving devices are part of an access means, in particular a wireless key, and/or the first object is a motor vehicle. In particular, based at the first signal received at the second object and/or the multiple second receiving devices and the at least one first further signal, a direction and/or a distance, at which the first object is located is determined, in particular by triangulation, and in particular by an evaluation unit. In particular, an angle and/or an angular difference between the first object and the second object and/or one of the plurality of second receiving devices and/or between the second object and one of the plurality of second receiving devices is determined on the basis of the first and at least one first further signal received at the second object and/or the plurality of second receiving devices, in particular by phase comparison of the first and first further signal at the second object and/or the plurality of second receiving devices, in particular by an evaluation unit. In particular, a relative orientation, an angle, a change in the relative orientation and/or the angle, a distance and/or a change in the distance between at least a first and a second object and/or a second receiving device is thus determined, in particular by an evaluation unit.

Particularly advantageously, several first objects are/will be provided, which are locally and fixedly attached to the first object, however, spaced apart from the latter, in particular spaced apart by at least 10 cm, and/or the emission and/or method according to the invention is performed with respect to each of the plurality of first objects, and in particular at least one virtual frequency switching time is determined with respect to each first object from the first and first further signals received at the second object. Particular advantageously, several second objects are/is provided, which are locally and fixedly attached to the second object, however, spaced apart therefrom, in particular spaced apart by at least 10 cm, and/or the emission and/or method according to the invention is carried out with respect to each of the several second objects, and in particular at least one virtual frequency switching time is determined with respect to each second object from the first and first further signals received at the first object, in particular by an evaluation unit. In particular, a relative orientation, an angle, a change in relative orientation and/or angle, a distance and/or change in distance between at least a first object and a second object is thereby determined, in particular by an evaluation unit.

Particularly advantageously, a change in distance between the first and second object is determined on the basis of the phase change between a first received signal and several received first further signals and/or determined therefrom by means of the difference in length of at least two signal paths of the first and first further signals, in particular assuming a static arrangement and environment of the first and second object during the transmission of the first and first further signals, in particular by an evaluation unit. In particular, the shortest signal path and/or the signal component received via the shortest signal path is determined, in particular by an evaluation unit.

Particularly advantageously, a change in distance between the first and second object is determined on the basis of the phase change between a received second signal and several received second further signals and/or it is determined therefrom by the difference in length of at least two signal paths of the second and the second further signals, in particular assuming a static arrangement and environment of the first and second object during the transmission of the second and the second further signals, in particular by an evaluation unit. In particular, the shortest signal path and/or the signal component received via the shortest signal path is determined.

Particularly advantageously, on the basis of the phase change between a received first signal and several received first further signals, an angle of incidence and/or a change thereof between the first and second object is determined and/or it is determined by means of the difference of the angle of incidence and/or angle of emission of at least two signal paths of the first and first further signals, in particular assuming a static arrangement and environment of the first and second object and/or the receiving devices and the second object during the transmission of the first and first further signals, in particular by an evaluation unit.

Particularly advantageously, on the basis of the phase change between a received second signal and several received second further signals, a relative orientation, an angle, a change in the relative orientation and/or the angle, a distance and/or a change in the distance between at least the first and the second object is determined, in particular, by means of an evaluation unit and/or is determined by means of the difference of the angle of incidence and/or angle of emission of at least two signal paths of the second and the second further signals, in particular assuming a static arrangement and environment of the first and second objects and/or the receiving devices and the first and/or second object during the transmission of the second and the second further signals, in particular by an evaluation unit.

Figure 2:
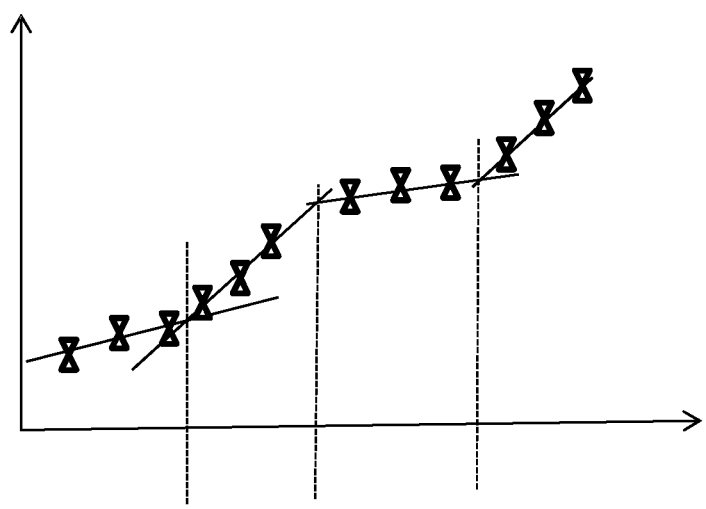
Figure 3:
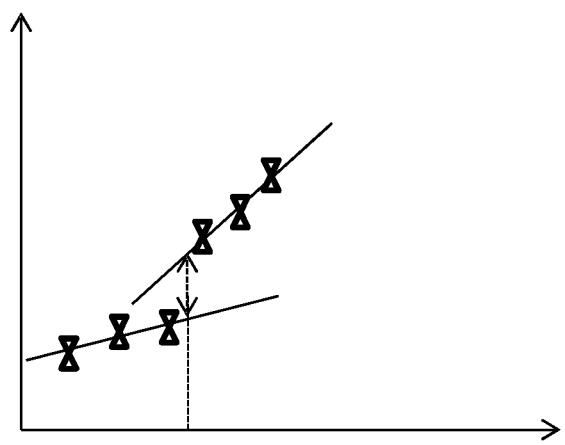
Figure 4:
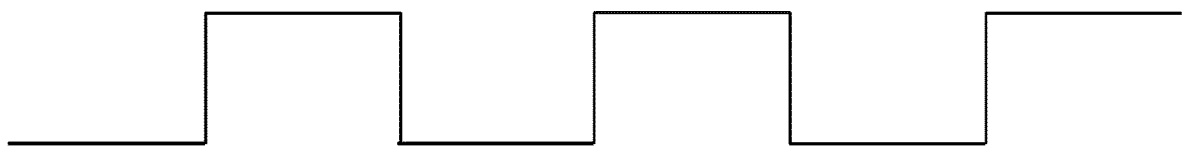
Figure 4:
Figure 5:
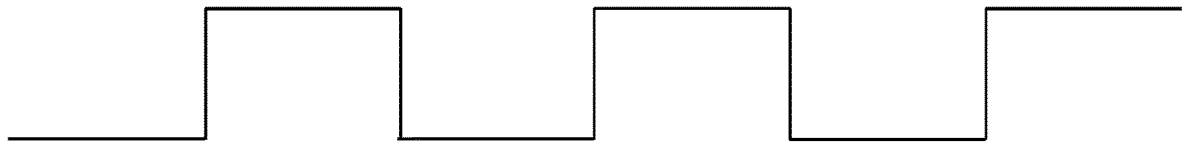
Figure 5:
Figure 6:
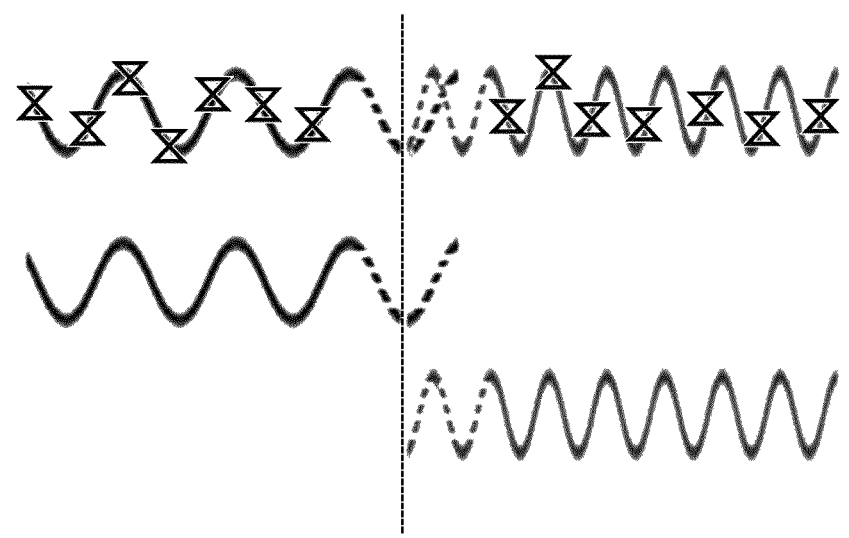
Figure 7:
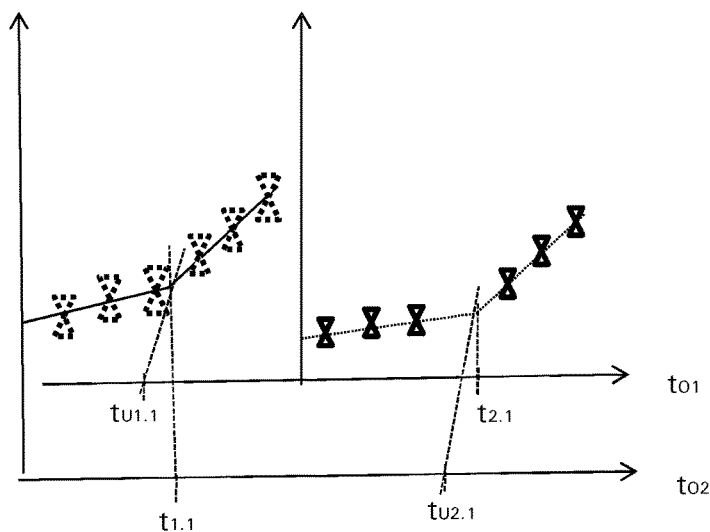
Figure 8:
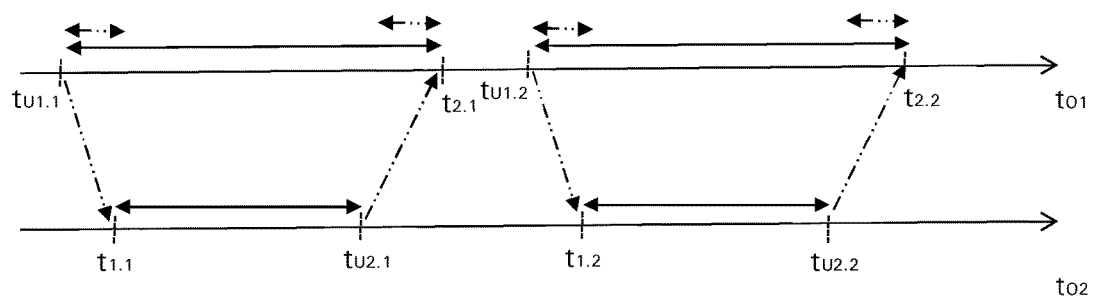
Figure 9:
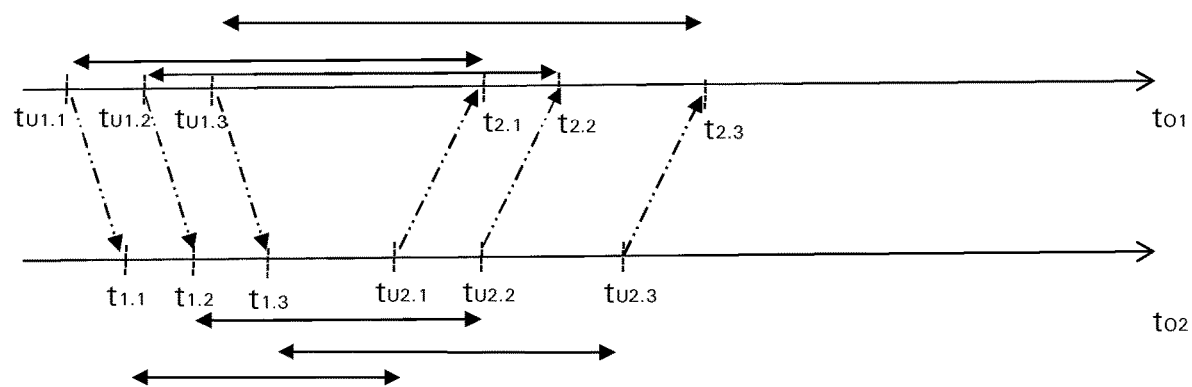

Further advantages and features of the invention will become clear from the following description of an exemplary embodiment with reference to the accompanying drawings. In the drawings:

FIG. 1 is an illustration of the switching between two PLLs,

FIG. 2 is an illustration for determining multiple virtual frequency switching times, FIG. 3 is an illustration for determining a virtual frequency switching time with phase offset, FIG. 4 is an illustration of a first signal and a first further signal together with the binary signal used for generation, FIG. 5 is an illustration of a first signal and a first further signal together with the binary signal used for generation, FIG. 6 is an illustration for determining a virtual frequency switching time, FIG. 7 is an illustration of a signal round-trip time measurement, FIG. 8 is an illustration of two signal round-trip time measurements, and FIG. 9 is an illustration of a sequence of several following first and following second signals for measuring the signal round-trip time.

FIG. 1 shows two PLLs, which can emit their output signal via an amplifier to an antenna by means of a downstream switch. Only the signal of one PLL may be forwarded. Each of the PLLs can be set to different frequencies.

Furthermore, a control system is shown, which is configured to evaluate the phases of the signals of the PLLs and calculate a switching time, at which the switch is being activated and resulting in a continuous phase-coherent signal. In particular, switching elements designed as semiconductors are used as switches, e.g., transistors or MOSFETs.

FIG. 2 shows phase measurements on a first signal (S1) (three marks on the left) and on three first further signals (S1w.1-S1w.3) (next three marks) with different frequencies (f1, f1w.1-f1w.1-f1w.3) received at a second object after being emitted from a first object, plotted against time, including extrapolations of the measured values based on interpolation, as straight lines. The intersection points of the straight lines are each indicated by a vertical dashed line, which marks the first virtual frequency switching time (dashed line on the left), and further virtual frequency switching times (following dashed lines), which can each be determined in this way assuming phase-coherent switching (first and further phase differences each equal zero).

FIG. 3 shows phase measurements on a first signal (left three marks) and on a first further signal (three marks on the right) plotted against time, as well as extrapolations of the measured values based on interpolation, as straight lines. The vertical dashed line indicates the first virtual frequency switching point, which may be determined in this way assuming toggling with a first phase difference represented by the double arrow (first phase difference < >0).

FIG. 4 shows a binary signal on top, and a frequency shift keyed signal below by coherent switching between two PLLs tuned to different frequencies. Below this, the resulting signal is characterized as a repeating sequence of first and further first signals. In principle, in the case of repetitions (including with different frequencies), the switch between the first further frequency to the first frequency is also advantageously evaluated, e.g., by performing the method on the assumption that the first further signal represents the first signal and the first signal following this represents the first further signal.

FIG. 5 shows an illustration similar to FIG. 4, with the difference that each switching (frequency shift keying) requires a minor time gap and a predetermined phase jump.

FIG. 6 shows an alternative determination of a first virtual frequency switching time with phase-coherent switching. The upper line shows samplings at the first signal (left seven marks) and samplings at the first further signal (seven marks on the right) shown over time from left to right. The variation over time of the first signal (left) and the first further signal (right) is illustrated as solid lines. No signal is present or no signal is received in the area of the continued dashed line. The dashed lines can be determined by extrapolating by an equalization calculation on the sampling d values of the first signal or the first further signal. Thus, the first virtual frequency switching time, indicated by a vertical dashed line, may be determined. Note that not every contact of the dashed lines represents a virtual frequency switching time, since the phase position must be identical.

The results of the equalization calculation and the extrapolations are shown separately.

FIG. 7 again shows the phase plotted against time. Two temporal axes can be seen, one for the time period at the first object, $t_{O1}$, and one for the second at the second object, $t_{O2}$; the signals emitted from the first object and received at the second object (first signal and first further signal), at which the second object takes phase measurements (dashed measuring points), are shown on the left. The first object has switched or changed the frequency without a phase jump at the time $t_{U1.1}$. From the measuring points of the phase measurements of the second object, the corresponding virtual frequency switching time $t_{1.1}$ can be determined. According to the above explanations, this is also feasible with other types of switching, e.g., interruption of the emission and/or a phase jump. Subsequently, the signal emitted from the second object is received at the first object, as are the second signal and the second further signal. Thus, the second object has changed frequency in a phase coherent manner at the time $t_{U2.1}$. The first object takes phase measurements on the signals (measuring points on the right in the figure). From this, the corresponding second virtual frequency switching time can be determined.

From the first interval determined at the first object from $t_{U1.1}$ to $t_{2.1}$ and the second interval determined at the second object from $t_{1.1}$ to $t_{U2.1}$, the signal round-trip time can be calculated by subtracting the second interval from the first. This will now be explained again in more detail with reference to the following drawings.

FIG. 8 shows the scenario depicted in FIG. 7 on the left. The slanted dashed arrows illustrate the radio transmission, first from the first object to the second object, and then from the second object to the first object. However, at the indicated points in time, e.g., $t_{U1.1}$, no pulse is emitted, however, the toggling is situated there, such that if the frequency change along with an interruption at this time, no signal whatsoever is emitted. The arrows between the temporal axes are thus more apt to illustrate the transmission than represent an actual signal. The first and second time differences explained above are indicated as time intervals, each with a double arrow. it can be seen that their difference coincides with the sum of the signal runtimes. These signal runtimes are again illustrated above the upper time line as dashed double arrows parallel to the time line. In the further course of time, i.e., in the figure further to the right, a further implementation of the scenario from FIG. 7 is shown, which is carried out in particular with other frequencies. For example, the accuracy may be increased or ambiguities may be avoided for range finding based on phase shifts, if the measurements are evaluated in combination. However, it is preferable not to carry out the implementations sequentially in a time-separated manner, as in FIG. 8, but to work with several consecutive first signals and several consecutive second further signals, as illustrated, e.g., in FIG. 9.

FIG. 9 shows in the notation from FIG. 8, an implementation with a first signal and three first further signals and a second signal and three second further signals, in which three first switching times or switching times $t_{U1.n}$, three first virtual frequency switching times $t_{1.n}$, three second switching times or toggling times $t_{U2.n}$ and three second virtual frequency switching times $t_{2.n}$ are present. It can be seen that the time interval between the first virtual frequency switching time and the first second frequency-toggling time (lowest double arrow in FIG. 9) is roughly the same as the time interval between the second virtual frequency switching time and the second frequency-toggling time (third double arrow from the bottom in FIG. 9), while the time interval between the third first virtual frequency switching time and the third second frequency switching time (second double arrow from the bottom in FIG. 9) is substantially greater. This should make it obvious that the length of these time intervals is unimportant, they only need to be known (predetermined or measured).

Three signal round-trip times can now be determined directly from these measurements. However, by calculating further time intervals between the respective points in time drawn on a time line, further signal round-trip times can also be determined.

This determination, however, makes it possible to now synchronize or correct the clocks or times of the two objects with a very high degree of accuracy. From the signal round-trip time (averaged from several determinations, as needed), the signal runtime may be determined by way of halving. Thus, for example, the second object can determine the exact position of the time $t_{U1.1}$ on the first object on its second-object clock by subtracting the signal runtime (half the round-trip time) from the time $t_{1.1}$. This means that the clock on the second object can now also be synchronized with the first object clock with great accuracy. Thus, with certain hardware, a time alignment may be done, which is far more accurate than was previously feasible with the prior-art methods

The invention claimed is:

1. A method for determining at least one first virtual frequency switching time between a first frequency (f1) and at least one first further frequency (f1w.n), wherein the first frequency (f1) is of a first signal (S1) emitted from a first object and having a first phase progression and at least one first further frequency (f1w.n) is of a first further signal (S1w.n) emitted from the first object and having a first further phase progression;

determining a first first phase relationship (phi1.1) of at least one first further phase progression of at least one first further signal (S1w.n) to the first phase progression of the first signal (S1) at the first object;

determining a first second phase relationship (phi2.1) of the first signal (S1) received at a second object from a phase progression received at the second object, and of the at least one phase progression of the at least one first further signal (S1w.n) received at the second object; and determining the at least one first virtual frequency switching time (t1.1) as a time at which, at the second object, the phase relationship between interpolated or received phase positions of the first signal and the first further signal (S1, S1w.1) corresponds to the first first phase relationship (phi1.1).

2. The method according to claim 1, further comprising:
determining a second virtual frequency switching time between a second frequency (f2) of a second signal (S2) emitted by the second object and at least one second further frequency (f2w.n) of a second further signal (S2w.n) emitted by the second object and having a second further phase progression;

determining a first second phase relationship (phi2.1) of the at least one second further phase progression of the at least one second further signal (S2w.n);

determining at least one second virtual frequency switching time (t2.1) from a phase progression of the second signal (S2) received at the first object and the at least one phase progression of the at least one second further signal (S2w.n) received at the first object, as a point in time at which at the first object the phase relationship between interpolated or received phase progressions of the second signal (S2) and the first second further signal (S2w.1) corresponds to the first second phase relationship (phi2.1); and wherein the second frequency (f2) and the at least one second further frequency (f2w.n) are each higher than 1 MHz.

3. The method according to claim 1, further comprising:
emitting at least two first further signals from the first object;

determining two first virtual frequency switching times between the first frequency (f1) and at least two first further frequencies (F1w.n);

determining first phase relationships (phi1.n) exist between successive first or first further signals at the first object;

determining each of the at least two first virtual frequency switching times (t1.n) from a phase progression received at the second object of the first signal (S1) received at the second object and the phase progressions of the at least two first further signals (S1w.n) received at the second object, as a time at which the phase relationship between interpolated or received phase positions of two signals from the first signal (S1) and the at least two first further signals (S1w.n) at the second object corresponds to the respective first phase relationship (phi1.n) between these signals at the first object; or emitting at least two second further signals from the second object and determining at least two second virtual frequency switching times between the second frequency (f2) and at least two second further frequencies (F2w.n); determining second phase relationships (phi2.n) between successive second or second further signals; and determining at least two second virtual frequency switching times (t3.n) from a phase progression received at the first object of the second signal (S2) received at the first object and the phase progressions of the at least two second further signals (S2w.n) received at the first object, each as a time at which the phase relationship between interpolated or received phase positions of two signals from the second and the at least two second further signals (S2, S2w.n) at the second object corresponds to the respective second phase relationship (phi2.n) between these signals.

4. The method according to claim 1, further comprising:
generating the first signal (S1) and the first further signal (S1w) by means of a first single PLL or by two first PLLs, between which toggling is done in order to switch the frequency; or generating the second signal (S1) and at least one second further signal (S1w) by means of a single second PLL or by two second PLLs, between which toggling is done in order to switch the frequency.

5. The method according to claim 1, further comprising:
switching or toggling at the first object between the emission of the first signal and of the at least one first further signal; or switching or toggling at the second object between the emission of the second signal and of the at least one second further signal and at least one second further signal.

6. The method according to claim 1, wherein there is a time interval of at most 500 µs between the end of the first signal (S1) and the beginning of the first further signal (S1w.1) or between the end of the first further signal (S1w.1) and the beginning of a second first further signal (S1w.2); or wherein there is a time interval of at most five or of at most 500 µs between the end of the second signal (S2) and the beginning of the second further signal (S1w.1) or between the end of the first second further signal (S2w.1) and the beginning of a second second further signal (52w.2).

7. The method according to claim 1, wherein the first frequency (f1) differs from the at least one first further frequency by a first difference (df1), or the second frequency differs from the at least one second further frequency by a second difference (df2), or wherein the first difference (df1) or the second difference (df1) has a value in the range of 100 kHz multiplied by the phase resolution up to 80 MHz achieved by the number of samplings performed of the first signal (S1) or of at least one first further signal (S1w.n) multiplied by the phase resolution achieved by the number of samplings performed of the first signal (S1) or of at least one first further signal (S1w), or wherein the first difference (df1) differs from the second difference (df2) by at least 10%.

8. The method according to claim 1, wherein at least one first virtual frequency switching time is used for synchronization of the second object or of the first signal received at the second object or of a first further signal; or wherein a first switching time at which the phase relationship between the phase position of the first signal (S1) and the phase position of a first further signal (S1w.n) at the first object corresponds to one of the first phase relationships (phi1.n) has a predetermined or determinable time relationship relative to a signal emitted from the second object.

9. The method according to claim 1, further comprising:
determining at the virtual frequency switching time (t1) the phase position of the first signal (S1) or at least one of the first further signals (S1w.n) at the second object; and using the virtual frequency switching time (t1) or the phase position of the first signal (S1) or at least one of the first further signals (S1w.n) at the second object at the virtual frequency switching time (t1) for range finding or measuring the change in distance between the first object and the second object.

10. A method for signal round-trip time measurement or signal runtime measurement or for measuring a phase round-trip shift at least between a first object and a second object, including the steps of:
   a. performing a reference sequence including, at least once, the following steps of:
      i. sending a reference signal (RS) from the second object to the first object before, at or after a first reference time (t1');
      ii. receiving the reference signal (RS) at the first object;
   wherein, at the second object, determining a first time difference (dt1) between a virtual frequency switching time (t1) and a reference time (t1'); and
   wherein, at the first object, determining a second time difference (dt2) between a first switching time at which a phase relationship between a phase position of a first signal (S1) and the phase position of a first further signal (S1w.n) at the first object corresponds to a first phase relationship (phi1), and reception of the reference signal (RS) at the first object; and
   calculating a signal round-trip time or signal runtime or phase round-trip shift between the first and second object from the first time difference (dt1) and second time difference (dt2).

11. The method according to claim 10, wherein the reference signal (RS) has a second signal (S2) and at least one second further signals (S2w.n), wherein the second signal (S2) has a second frequency and a second phase progression, and each of the second further signals (S2w.n) has a second further frequency (f2w.n) and a second further phase progression;
   determining the at least one second phase relationship (phi2.n) using the at least one second further phase progression of the at least one second further signal (S2w.n) to the respective preceding or following second further phase relationship of the at least one second further signal (S2w.n) or second phase progression of the second signal (S2);
   determining at least one, second virtual frequency switching times (t2.n) from each of a time phase progression of the second signal (S2) received at the first object and the time phase progression of at least one second further signal (S2w.n) received at the first object further signal, as a time between interpolated or received phase positions of two signals from the second and the second further signals (S2, S2w.n) corresponding to the respective second phase relationship (phi2.n) between these signals; and
   wherein at the first reference time (t1') and at a second switching time the phase relationship between the phase position of the second signal (S2) and the phase position of at least one second further signal (S2w.n) at the second object corresponds to the second phase relationship (phi2.n) between these signals.

12. The method according to claim 10, further comprising:
   determining the phase relationship at the second object between reference signal (RS), second signal (S2) or second further signal (S2w), and first signal (S1) or the phase relationship between reference signal (RS) and first further signal (S1w), or determining the phase relationship at the first object between reference signal (RS) and first signal (S1) or the phase relationship between reference signal (RS) and first further signal (S1w).

13. The method according to claim 10, further comprising:
   emitting a first further signal (S1w) several times in succession after a first signal (S1), or emitting a first signal (S1) and a first further signal (S1w) several times in succession after the first signal (S1), or emitting a second further signal (S2w) several times in succession after a second signal (S2), or emitting a second signal (S2) and a second further signal (S2w) several times in succession after the second signal (S2) by switching on or switching off an amplifier at the first or second object.

14. The method according to claim 10, further comprising:
   determining the first virtual frequency switching time (t1) according to a same rule as the first switching time (t1'); or
   determining the first virtual frequency switching time (t1) as the first switching time (t1'); or
   determining the first virtual frequency switching time (t1') as a first virtual frequency switching time which lies at a same position in the signal progression of the first signal (S1) and the first further signal (S1w) as the first switching time (t1').

15. A use of at least one first virtual frequency switching time (t1) between a first frequency (f1) of a first signal (S1) having a first phase progression emitted from a first object and at least one first further frequency (f1w.n) of at least one first further signal (S1w.n) emitted from the first object and having a first further phase progression, and a reference time, wherein a reference signal is sent from a second object such that the reference signal exhibits a change at the reference time, in order to determine a time, a distance, a runtime or for synchronizing two time measurements;
   determining a first first phase relationship (phi1.1) of the first phase progression of the first signal (S1) relative to a first further phase progression of a first first further signal (S1w.n) at the first object;
   receiving a phase progression of the first signal (S1) at the second object and receiving the phase progression of the first first further signal (S1w.1) at the second object;
   determining at least one first virtual frequency switching time (t1) as a time at which a phase relationship between interpolated or received phase positions of the first and the first further signal (S1, S1w.1) at the second object corresponds to the first first phase relationship (phi1.1).

16. The use according to claim 15, wherein the first frequency (f1) and the at least one first further frequency (f1w.n) and the second frequency (f2) and the at least one second further frequency (f2w.n) are each higher than 1 MHz.

17. The use according to claim 15, wherein the reference signal is sent before or after the reference time (t1'), or that the change at the reference time is a frequency change, phase change, edge or frequency switch.

18. The use according to claim 15, wherein the first signal (S1) and the first further signal (S1w) are generated by means of a first single PLL or by two first PLLs, which are toggled in order to switch the frequency, or wherein the second signal (S1) and the second further signal (S1w) are generated by means of a single second PLL or by two second PLLs, which are toggled in order to switch the frequency.

19. The use according to claim 15, wherein, at the first object, switching or toggling is done between the emission of the first signal and the at least one first further signal, or wherein, at the second object, switching or toggling is done between the emission of the second signal and the at least one second further signal.

20. The use according to claim 15, wherein there is a time interval of at most 500 μs between the end of the first signal (S1) and the beginning of the first further signal (S1w.1) or between the end of the first first further signal (S1w.1) and the beginning of a second first further signal (S1w.2); or
wherein there is a time interval of at most five periods of the first or of the first further signal or of at most 500 μs between the end of the second signal (S2) and the beginning of the second further signal (S1w.1) or between the end of the first second further signal (S2w.1) and the beginning of a second second further signal (S2w.2).

21. The use according to claim 15, wherein the first frequency (f1) differs from the at least one first further frequency by a first difference (df1) or the second frequency differs from the at least one second further frequency by a second difference (df2), wherein the first difference (df1) or the second difference (df1) has a value of at least 0.02% of the frequency of the first or first further signal or of at least 50 kHz, or where the first difference (df1) or the second difference (df1) has a value in the range of 100 kHz multiplied by the phase resolution up to 80 MHz achieved by the number of samplings performed of the first signal (S1) or at least one first further signal (S1w.n) or wherein the first difference (df1) differs from the second difference (df2) by at least 10%.

22. The use according to claim 15, wherein at least one first virtual frequency switching time or wherein a first switching time, at which the phase relationship between the phase position of the first signal (S1) and the phase position of a first further signal (S1w.n) at the first object corresponds to one of the first phase relationships (phi1.n), has a predetermined or determinable time relationship relative to a signal emitted from the second object.

23. A device set up for determining at least one first virtual frequency switching time (t1) and sending a second signal and at least one second further signal, and set up for synchronization, for signal round-trip time measurement or signal runtime measurement or for measuring the phase round-trip shift or for range finding or measuring a distance change, having at least one means for receiving a first signal (S1) and at least one first further signal, and for sending the second signal and at least one second further signal from a first object, set up for determining at least one virtual frequency switching time between a first frequency (f1) of the first signal (S1) and at least one first further frequency (f1w.n) of the at least one first further signal (S1w.n);
wherein least one first further phase progression of the at least one first further signal (S1w.n) has a first first phase relationship (phi1.1) to the first phase progression of the first signal (S1) at the first object, and
wherein the device is set up to determine from a phase progression of the first signal (S1) received at the device, and of least one phase progression of the at least one first further signal (S2w.n) received at the device, the at least one virtual frequency switching time (t1.1) as a time, at which, at the device, a phase relationship between interpolated or received phase positions of the first and the first further signal (S1, S1w.1) corresponds to the first first phase relationship (phi1.1).

24. A device set up to emit a first signal (S1) and at least one first further signal (S1w.n) for signal round-trip time measurement or signal runtime measurement or for measuring the phase round-trip shift or for range finding, said device comprising:
at least one PLL for generating the first signal (S1) at a first frequency and the at least one first further signal (S1w) at a first further frequency;
wherein the device is set up to toggle between generation of the first signal (S1) and generation of the at least one first further signal (S1w.n) using knowledge or determination of a phase difference (phi1.n) between the first signal (S1) and the first further signal (S1w.n);
wherein the device is set up to receive a second signal (S2) from a second object and at least one second further signal from said second object;
wherein the device is further set up to determine at least one virtual frequency switching time between a second frequency (f2) of the second signal (S2) and at least one second further frequency (f2w.n) of the at least one second further signal (S2w.n);
wherein at least one second further phase progression of the at least one second further signal (S2w.n) has a first second phase relationship (phi2.1) to a second phase progression of the second signal (S2) at the second object; and
wherein the device is set up to determine from a phase progression of the second signal (S2) received at the device, and of at least one phase progression of the at least one second further signal (S2w.n) received at the device, at least one virtual frequency switching time (t2.1) as a time, at which, at the device, a phase relationship between interpolated or received phase positions of the second and a second further signal (S2, S2w.1) corresponds to the first second phase relationship (phi2.1).

25. A system for synchronization, for signal round-trip time measurement or signal runtime measurement or for measuring the phase round-trip shift or for range finding or measuring a distance change comprising at least one first and one second device;
wherein the first device is set up to emit a first signal (S1) and at least one first further signal (S1w.n), having at least one PLL for generating the first signal (S1) at a first frequency and the at least one first further signal (S1w) at a first further frequency;
wherein the first device is set up to toggle between generation of the first signal (S1) and generation of the at least one first further signal (S1w.n) using knowledge or determination of the phase difference (phi1.n) between the first signal (S1) and a first further signal (S1w.n);
wherein at least one first further phase progression of the at least one first further signal (S1w.n) has a first first phase relationship (phi1.1) to a first phase progression of the first signal (S1) at the first device, wherein first device is set up to predetermine, determine or know the first first phase relationship (phi1.1); and
wherein the first device is set up to receive a second signal (S2) from the second device and at least one second further signal from said second device, and is set up to determine at least one virtual frequency switching time between a second frequency (f2) of the second signal (S2) and at least one second further frequency (f2w.n) of at least one second further signal (S2w.n);
wherein the first device is set up to determine from a phase progression of the second signal (S2) received at the first device, and of at least one phase progression of the at least one second further signal (S2w.n) received at the first device, at least one virtual frequency switching time (t2.1) as a time, at which, at the first device, a phase relationship between interpolated or received phase positions of the second signal (S2) and a second further signal (S2w.1) corresponds to a first second phase relationship (phi2.1);

wherein the second device is set up to emit the second signal (S2) and the at least one second further signal (S2w.n), having at least one PLL for generating the second signal (S2) at the second frequency and the at least one second further signal (S2w) at a second further frequency;

wherein the second device is set up to toggle between generation of the second signal (S2) and generation of the at least one second further signal (S2w.n);

wherein at least one second further phase progression of the at least one second further signal (S2w.n) has a first second phase relationship (phi2.1) to a second phase progression of the second signal (S2) at the second device; and wherein the second device is set up to predetermine, determine or know the first second phase relationship (phi2.1) and is set up to determine from a phase progression of the first signal (S1) received at the second device, and of at least one phase progression of the at least one second further signal (S2w.n) received at the second device, the at least one virtual frequency switching time (t1.1) as a time, at which, at the second device, a phase relationship between interpolated or received phase positions of the first and the first further signal (S1, S1w.1) corresponds to the first first phase relationship (phi1.1).

* * * * *